May 10, 1966  J. L. GYLLENBERG  3,250,309
QUICK RELEASE FASTENER
Filed Aug. 11, 1964

JOHN L. GYLLENBERG
INVENTOR.
BY
BUCKHORN, BLORE, KLARQUIST & SPARKMAN
ATTORNEYS 3,250,309
QUICK RELEASE FASTENER
John L. Gyllenberg, 3590 Cedar St., Baker, Oreg.
Filed Aug. 11, 1964, Ser. No. 388,842
2 Claims. (Cl. 152—213)

This invention relates to a quick release fastener, and more particularly to a fastener for a tire chain.

There are many various devices where it is necessary to connect together the ends of a strand such as, for example, a chain or strap, and also to tighten the strand as its ends are so connected. One such device is a tire chain. Fasteners for the strands of such devices known hitherto have been complex, difficult in manipulation, and time consuming. It would be desirable to provide a fastener which quickly and easily secures together and releases the ends of a strand. It would also be desirable to provide such a fastener which also tightens the strand.

An object of the invention is to provide a new and improved quick release fastener.

Another object of the invention is to provide a new and improved fastener for a tire chain.

A further object of the invention is to provide a fastener which quickly and easily secures together the ends of a strand.

Yet another object of the invention is to provide a quick release fastener which tightens the strand while securing the ends of the strand together.

The invention provides a quick release fastener including a hitch pivotally connected to one end of a strand and adapted to be threaded through an eye in the other end of the strand. The hitch preferably has a loop portion adjacent the pivoted end thereof and a latching portion at the free end thereof adapted to receive and securely attach itself to a portion of the strand.

Figure 1:
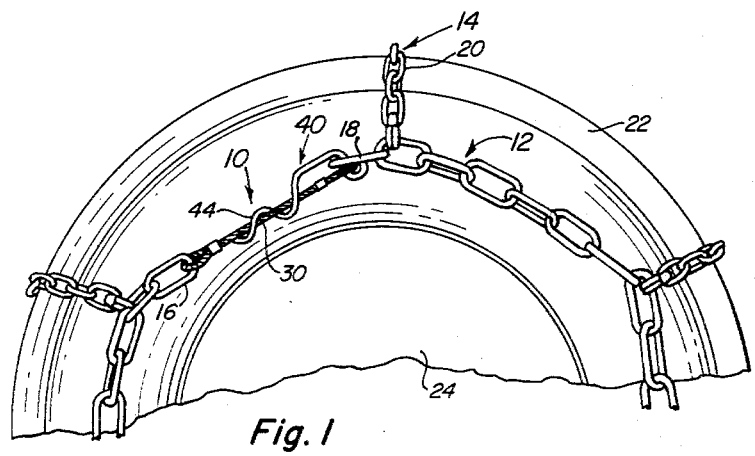
Figure 2:
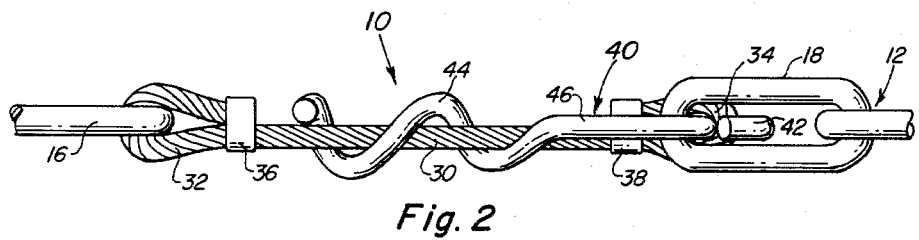
Figure 3:
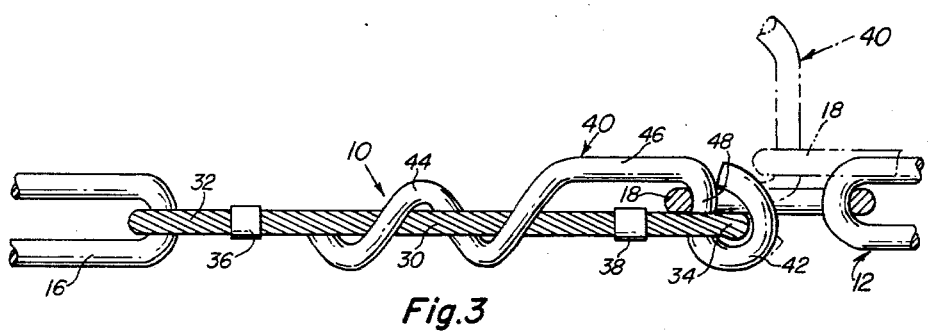

A complete understanding of the invention may be obtained from the following detailed description of a quick release fastener forming a specific embodiment thereof, when read in conjunction with the appended drawings, in which:

FIG. 1 is a fragmentary, side elevation view of a tire having a tire chain thereon which has a quick release fastener forming one embodiment of the invention; and FIGS. 2 and 3 are enlarged, top plan and side elevation views, respectively, of the quick release fastener of FIG. 1.

Referring now in detail to the drawings, there is shown therein a quick release fastener 10 which tightens a side chain 12 of a tire chain 14 as it also connects together end links 16 and 18 of the side chain 12. The tire chain 14, except for the fastener 10, is of conventional construction, and includes cross chains 20, two of the side chains 12 and two of the fasteners 10, one for each side chain 12. The tire chain 14 is shown in FIG. 1 in its operative position on a tire 22 mounted on a vehicle wheel 24.

The fastener 10 includes a flexible strand 30, preferably in the form of a stranded, steel wire cable, having eyes 32 and 34 formed by clamping bands 36 and 38 and, if desired, solder filling all spaces between the doubled back strand portions of the strand and between these strand portions and the bands. A hitch 40 of stiff, steel wire or rod, preferably of about the same diameter as that of the strand 30, has an eye portion 42 pivotally interlinked with the eye 34. A helical, latching, loop or hook portion 44 of over one turn and preferably of almost two turns forms the free end of the hitch 40. An elongated shank portion 46 forms, with an offsetting portion 48, the helical portion 44 and the strand 30, an openable link. The longitudinal axis of the helical latching portion 44 is offset laterally from the shank portion 46 so as to define with the shank portion and the offsetting portion 48, a shallow loop. The hitch 46 is, in effect, an L-shaped member pivoted to the strand 30 at one end, and having a securing portion at the other end. As illustrated in FIG. 3, when the hitch 46 is in its latching or fastening position in which the strand 30 extends through the helical portion and the hitch is threaded through the link 18, the side chain 12 is taut. To effect this fastened, taut condition of the side chain 12, with the helical portion 44 disengaged from the strand 30 and the hitch 40 in an open position extending away from the strand 30, the helical portion 44 is extended through the link 18, is pivoted to its position folded back along the strand 30 and then the strand is moved laterally into the helical portion while the helical portion is revolved relative to the strand. As the hitch is pivoted from its open position to its closed position, the link 18 is slid along the shank portion to an intermediate position as shown in broken lines in FIG. 3, and then, on continued movement of the hitch, the link is moved further to the left and is slid down the portion 48 to a position abutting the eye 34 of the strand 30. This movement of the link tightens the chain.

The above-described fastener 10 has a long tightening throw. The hitch thereof is easily threaded into the link 18, is easily moved from its extended open position to its closed position, and is easily secured to and disengaged from the strand 30. The fastener is simple and rugged and is admirably suited to fasten together the ends of a strand or strands while also tightening the strand or strands. It will be apparent that, while the fastener 10 is shown as part of a tire chain securing together strands of the chain type, the hitch can be pivoted to an eye end of a strand of the cable type as distinguished from a chain and threaded through a second eye end of the same strand or a different strand and then folded back and fastened to the strand to tighten the strand or strands and connect the ends thereof together. While the fastener 10 has been described as securing the two ends of a chain or strand together, it obviously can be used to secure together two elements which are not strand-like by securing the eye 32 to one of the elements and securing an eye (not shown) to the other element, the hitch being adapted to interlink with the last mentioned eye.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a tire chain,
   a side chain having a first end link and a second end link,
   a flexible strand secured at one end to the first end link and having at the other end thereof an eye,
   and a stiff rod member having at one end thereof an eye portion pivotally interlinking the eye of the flexible strand, an L-shaped portion extending from the eye portion and a helical hook portion at the other end of the member adapted to engage securely the flexible strand at a point remote from the eye thereof so that the rod member and the strand define a link,
   the eye portion and the L-shaped portion lying in substantially the same plane and the eye portion being positioned forwardly of the L-shaped portion,
   said L-shaped portion including a shank portion offset laterally on one side of the central axis extended of said helical hook portion.
   the hook portion being releasable from the strand and the rod member being threadable through the second end link.

2. In a quick release fastener,
strand means having an end portion provided with an eye,
and a stiff, elongated hitch including a shank portion and having at one end of the shank portion an eye portion interlinking with the eye on said strand means to permit movement of the hitch pivotally relative to said end portion of the strand means between an open position in which the shank portion extends away from the end portion of the strand means and a closed position in which the shank portion extends back along the strand means,
the hitch having at the other end of the shank portion a helical portion adapted to be threaded on the strand means to hold the hitch in the closed position thereof,
the eye portion of the hitch lying in substantially the same plane as the shank portion,
said shank portion being offset laterally on one side of the central axis extended of said helical portion,
the eye portion of said hitch being aligned longitudinally with said central axis.

References Cited by the Examiner

UNITED STATES PATENTS

| | | | |
|---|---|---|---|
| 1,780,184 | 11/1930 | Gleason | 24—129 |
| 2,743,754 | 5/1956 | Maresh | 152—213 |

ARTHUR L. LA POINT, *Primary Examiner.*

EUGENE G. BOTZ, *Examiner.*

C. W. HAEFELE, *Assistant Examiner.*